(12) United States Patent
Stevens et al.

(10) Patent No.: US 10,584,613 B2
(45) Date of Patent: Mar. 10, 2020

(54) NECKED DEBRIS SEPARATOR FOR A GAS TURBINE ENGINE

(71) Applicant: United Technologies Corporation, Farmington, CT (US)

(72) Inventors: Michael S. Stevens, Alfred, ME (US); David Richard Griffin, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 266 days.

(21) Appl. No.: 16/038,542

(22) Filed: Jul. 18, 2018

(65) Prior Publication Data

US 2020/0025041 A1  Jan. 23, 2020

(51) Int. Cl.
*F01D 25/32* (2006.01)
*F01D 9/04* (2006.01)

(52) U.S. Cl.
CPC ............. *F01D 25/32* (2013.01); *F01D 9/042* (2013.01); *F05D 2220/3212* (2013.01); *F05D 2240/14* (2013.01)

(58) Field of Classification Search
None
See application file for complete search history.

(56) References Cited

U.S. PATENT DOCUMENTS

| | | | |
|---|---|---|---|
| 3,302,395 A * | 2/1967 | Robbins | F02C 7/05 60/39.092 |
| 3,302,396 A * | 2/1967 | Robbins | F02C 7/05 60/39.092 |
| 4,076,508 A * | 2/1978 | Christensen | B01D 50/00 55/309 |
| 4,084,825 A * | 4/1978 | Ludwig | F01D 11/02 277/348 |
| 5,279,109 A | 1/1994 | Liu et al. | |
| 5,498,273 A | 3/1996 | Mann | |
| 6,019,575 A * | 2/2000 | Boursy | F01D 25/007 415/121.2 |
| 7,147,684 B2 | 12/2006 | Anderson et al. | |
| 7,837,753 B2 * | 11/2010 | Roundy | F02C 7/052 55/385.3 |
| 8,943,791 B2 * | 2/2015 | Tibbott | F01D 25/32 415/115 |
| 9,988,936 B2 | 6/2018 | Nasr et al. | |
| 10,036,319 B2 * | 7/2018 | Murray | B01D 50/002 |
| 10,427,075 B2 * | 10/2019 | Jennings | F02C 7/055 |

(Continued)

FOREIGN PATENT DOCUMENTS

| EP | 3156610 A1 | 4/2017 |
|---|---|---|
| EP | 3428411 A1 | 1/2019 |
| JP | 2017127796 A | 7/2017 |

OTHER PUBLICATIONS

European Search Report dated Oct. 31, 2019 issued for corresponding European Patent Application No. 19185864.6.

*Primary Examiner* — Michael Lebentritt
(74) *Attorney, Agent, or Firm* — Bachman & LaPointe, P.C.

(57) ABSTRACT

A debris separator for a gas turbine engine component includes a first body section along an axis, the first body section comprising a first orifice, a neck section adjacent to the first body section along the axis, and a second body section along the axis adjacent to the neck region, the second body section forming an exit along the axis.

18 Claims, 6 Drawing Sheets

(56) References Cited

U.S. PATENT DOCUMENTS

2013/0192257 A1\* 8/2013 Horine .................... F01D 11/08
                                                                                  60/796
2017/0065986 A1\* 3/2017 Goulds .................... B04C 3/06

\* cited by examiner

NECKED DEBRIS SEPARATOR FOR A GAS TURBINE ENGINE

BACKGROUND

The present disclosure relates to reduction of erosion in a gas turbine engine and, more particularly, to a debris separator for protecting a high pressure turbine case from the erosive effects of particulates in cooling airstreams.

Gas turbine engines typically include a compressor section to pressurize airflow, a combustor section to burn a hydrocarbon fuel in the presence of the pressurized air, and a turbine section to extract energy from the resultant hot effluent of the combustion gases. The combustion gases commonly exceed 2000 degree F. (1093 degree C.).

Cooling of engine components such as the high pressure turbine case may be complicated by the presence of entrained particulates in the secondary cooling airflow. Particulates pass through the secondary airflow passages and cause local areas of erosion. The particulates are very fine and are carried throughout sections of the engine. The erosion caused by the particulates entrained in the cooling air is generally dependent on the velocity and size of the particulates. As the velocity of the secondary airflow increases, so does the erosion caused by the entrained particulates.

SUMMARY

A debris separator for a gas turbine engine component according to one disclosed non-limiting embodiment of the present disclosure includes a first body section along an axis, the first body section comprising a first orifice; a neck section adjacent to the first body section along the axis; and a second body section along the axis adjacent to the neck region, the second body section forming an exit along the axis.

A further embodiment of any of the foregoing embodiments of the present disclosure includes that the first body section has a closed end and said first orifice opens radially outwardly.

A further embodiment of any of the foregoing embodiments of the present disclosure includes that the second body section is of a diameter less than a diameter of the first body section.

A further embodiment of any of the foregoing embodiments of the present disclosure includes that the second body section is flared.

A further embodiment of any of the foregoing embodiments of the present disclosure includes that the first body section and the second body section are tubular.

A gas turbine engine component according to one disclosed non-limiting embodiment of the present disclosure includes a vane support with a vane support aperture; and a debris separator mounted at least partially through the aperture in the vane support.

A further embodiment of any of the foregoing embodiments of the present disclosure includes a first body section along an axis, the first body section comprising a first orifice; a neck section adjacent to the first body section along the axis; and a second body section along the axis adjacent to the neck region, the second body section forming an exit along the axis.

A further embodiment of any of the foregoing embodiments of the present disclosure includes that the neck section abuts the vane support and the second body region passes at least partially through the vane support aperture.

A further embodiment of any of the foregoing embodiments of the present disclosure includes that the second body section is flared to retain the debris separator within the vane support aperture.

A further embodiment of any of the foregoing embodiments of the present disclosure includes a first body section along an axis, the first body section defining the first orifice transverse to the vane support aperture.

A further embodiment of any of the foregoing embodiments of the present disclosure includes a neck section adjacent to the first body section along the axis, the neck section abuts the vane support aperture.

A further embodiment of any of the foregoing embodiments of the present disclosure includes a second body section along the axis adjacent to a neck region, the second body section passes at least partially through the vane support aperture.

A further embodiment of any of the foregoing embodiments of the present disclosure includes that the vane support aperture defines an axis parallel to an engine axis.

A method of installing a debris separator for a gas turbine engine component according to one disclosed non-limiting embodiment of the present disclosure includes inserting a debris separator into a vane support aperture; and flaring the debris separator opposite a closed end to retain the debris separator in the vane support aperture.

A further embodiment of any of the foregoing embodiments of the present disclosure includes inserting the debris separator such that a neck section contacts upon the vane support.

A further embodiment of any of the foregoing embodiments of the present disclosure includes flaring a second body section downstream of the neck section.

A further embodiment of any of the foregoing embodiments of the present disclosure includes integrally forming the debris separator as an integral tubular component.

A further embodiment of any of the foregoing embodiments of the present disclosure includes integrally forming a closed end, a first body section, a second body section, and the neck section between the first and second body section.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
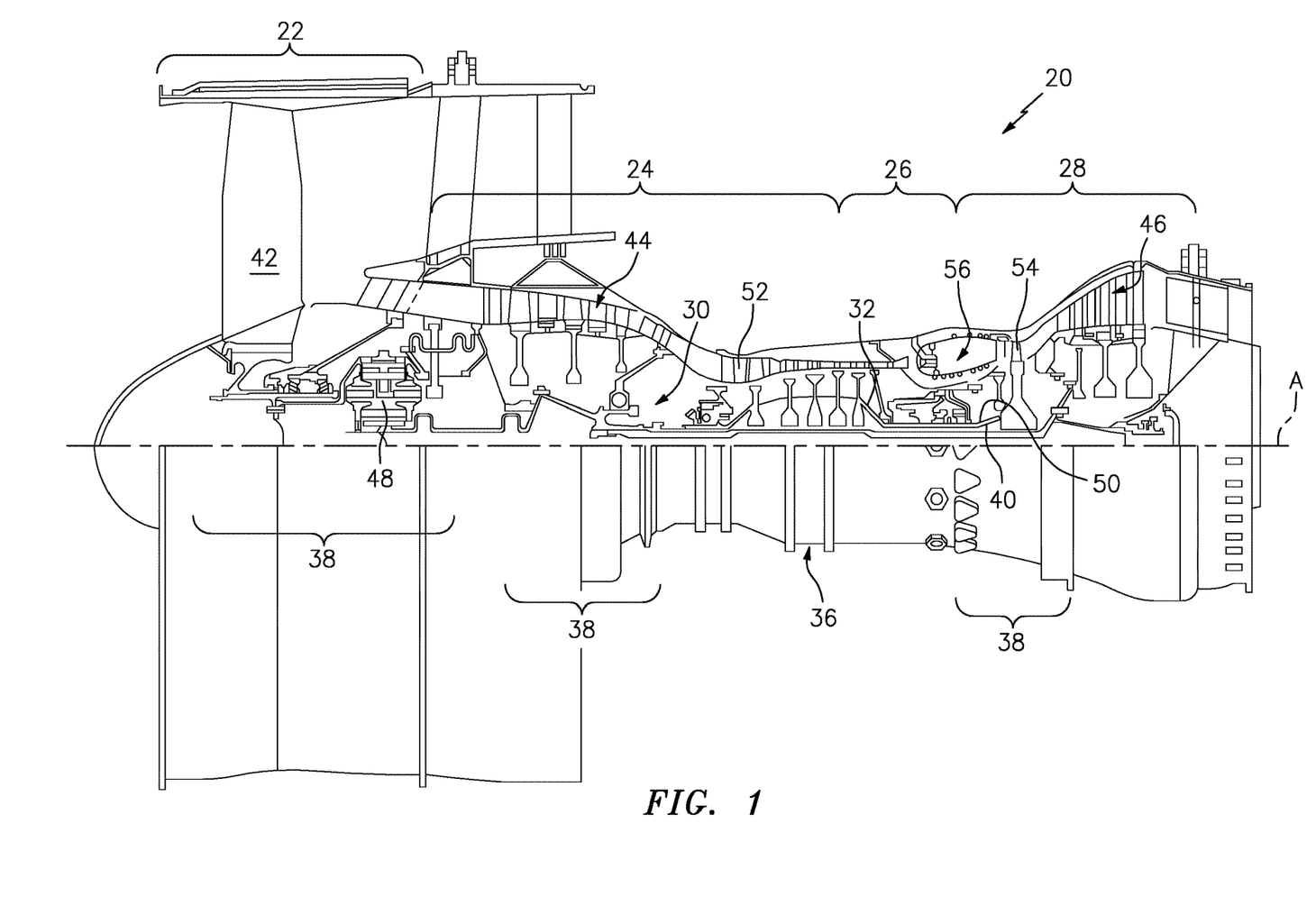
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited to use with turbofans as the teachings may be applied to other types of turbine engine architectures such as turbojets, turboshafts, and three-spool (plus fan) turbofans.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the engine case structure 36. It should be appreciated that various bearing structures 38 at various locations may alternatively or additionally be provided.

Figure 2:
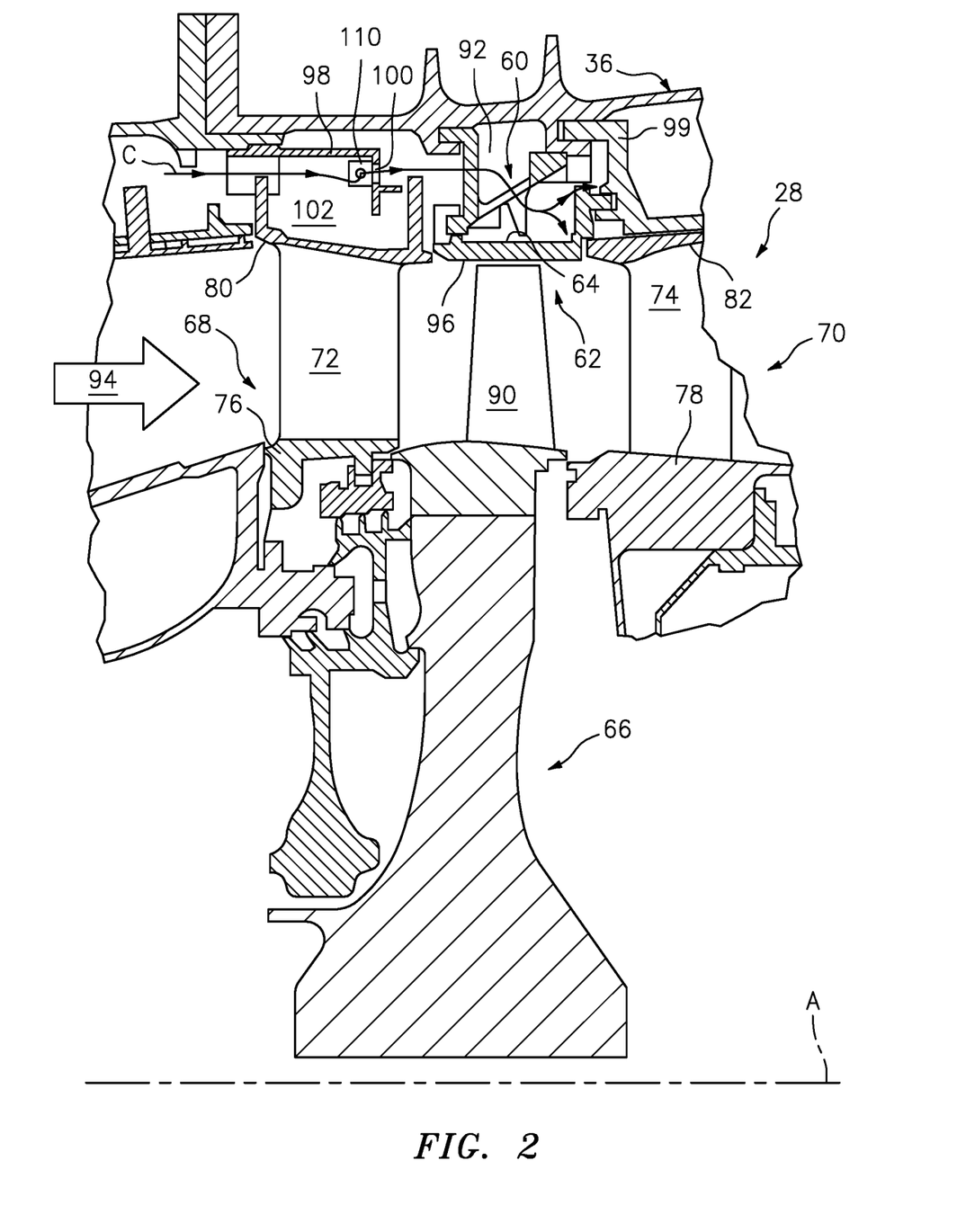
FIG. 2 is an enlarged schematic cross-section of an engine turbine section including a debris separator.

With reference to FIG. 2, an enlarged schematic view of a portion of the turbine section 28 is shown by way of example; however, other engine sections will also benefit herefrom. A full ring shroud assembly 60 within the engine case structure 36 supports a blade outer air seal (BOAS) assembly 62 with a multiple of circumferentially distributed BOAS 64 proximate to a rotor assembly 66 (one schematically shown).

The full ring shroud assembly 60 and the BOAS assembly 62 are axially disposed between a forward stationary vane ring 68 and an aft stationary vane ring 70. Each vane ring 68, 70 includes an array of vanes 72, 74 that extend between a respective inner vane platform 76, 78 and an outer vane platform 80, 82. The outer vane platforms 80, 82 are attached to the engine case structure 36.

The blade outer air seal (BOAS) assembly 62 is affixed to the engine case structure 36 and radially opposes the blades 90 of the rotor assembly 66 and forms in part an annular chamber 92 between the blade outer air seal (BOAS) assembly 62 and the engine case structure 36. The blade outer air seal (BOAS) assembly 62 bounds the working medium gas flow in a primary flow path 94. The forward stationary vane ring 68, as represented by the single vane 72, is affixed to the engine case structure 36 upstream of the blade outer air seal (BOAS) assembly 62. The stator vanes align the flow of the working medium gases while the rotor blades collect the energy of the working medium gases and turn the turbine which in turn drives the compressor.

The forward stationary vane ring 68 is supported with respect to the engine case structure 36 by a first vane support 98. The first vane support 98 is annular in shape and includes a multitude of metering apertures 100 spaced therearound. The aft stationary vane ring 70, as represented by the single vane 74, is affixed to the engine case structure 36 downstream of the blade outer air seal (BOAS) assembly 62 by a second vane support 99. The working medium gases flow alternately through the rows of vanes and blades of the turbine section.

Cooling air "C," often referred to as secondary airflow, often contains erosive particulates (such as sand) bled from the high pressure compressor to a first vane cavity 102 outboard of the forward stationary vane ring 68. As only a specific quantity of air is required for cooling the turbine case, the cooling air having entrained particulates is usually metered through the apertures 100. Higher cooling air pressure inherent in the first vane cavity 102, for example, an about 1.2 pressure ratio, causes air to flow from the cavity 102 through the apertures 100. The velocity of the cooling air and the particulates contained therein are accelerated as the air flows through the apertures 100 due to the reduced flow area of the orifices as compared to the flow area of the annular chamber 92 outboard of the blade outer air seal (BOAS) assembly 62.

If this high velocity stream impinges on a structure, such as the turbine case, erosion of the structure may occur. Erosion of the structure depends on several conditions such as the number and type of impinging particulates, particulate size, impact angles of the particulates, temperature and velocity of particulates. With other conditions being constant, this erosion is proportional to the velocity of the cooling air "C" containing particulates.

Figure 4:
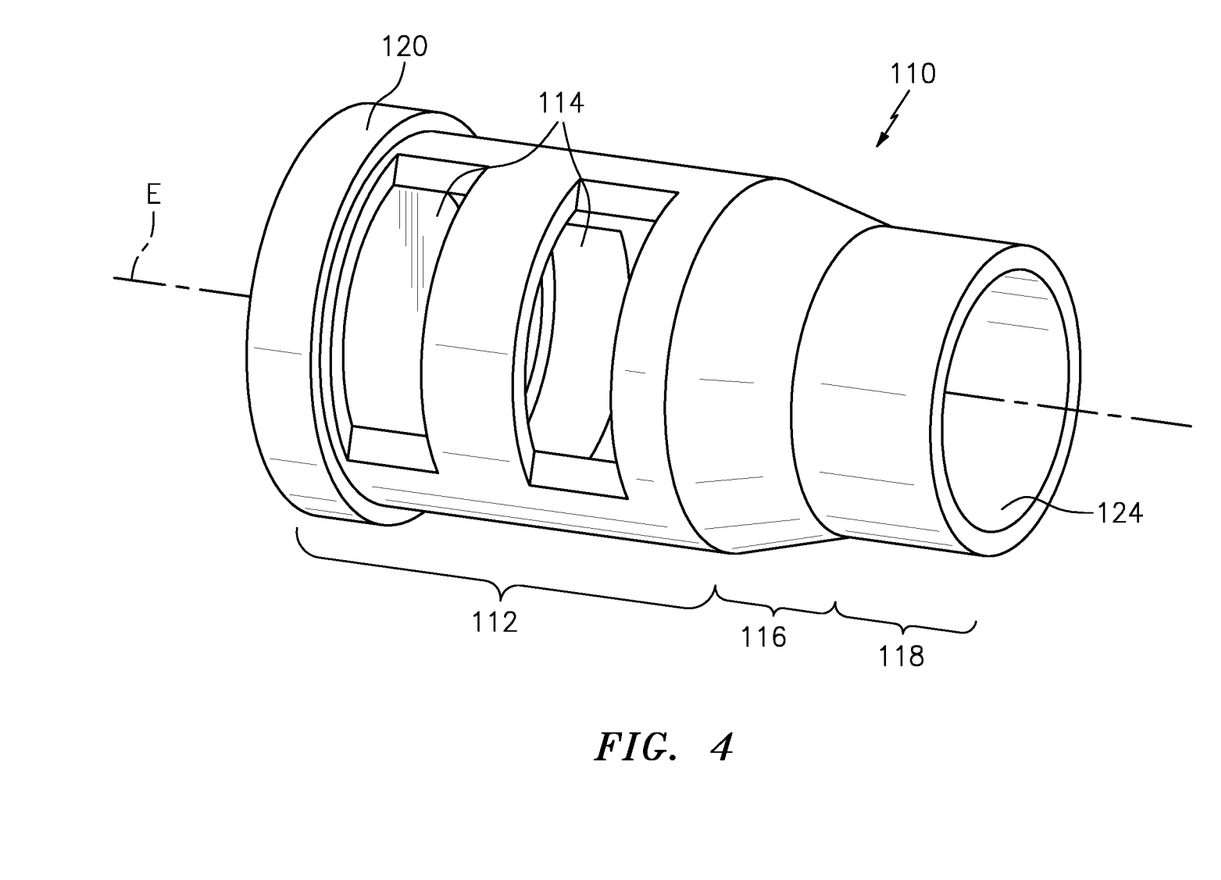
FIG. 4 is a perspective view of the debris separator according to one disclosed non-limiting embodiment.

The first vane support 98 includes a debris separator 110 located within each aperture 100 (also shown in FIG. 4). Each debris separator 110 is arranged at least partially through each aperture 100 along an axis "E" generally parallel to the engine axis A.

With reference to FIG. 4, the debris separator 110 includes a first body section 112 along an axis "E" with one or more inlet orifices 114 transverse to the axis "E," a neck section 116 adjacent and downstream of the first body section 112 along the axis, and a second body section 118 along the axis "E" adjacent to the neck section 116, the second body section defines an exit orifice 124 along the axis E.

Figure 3:
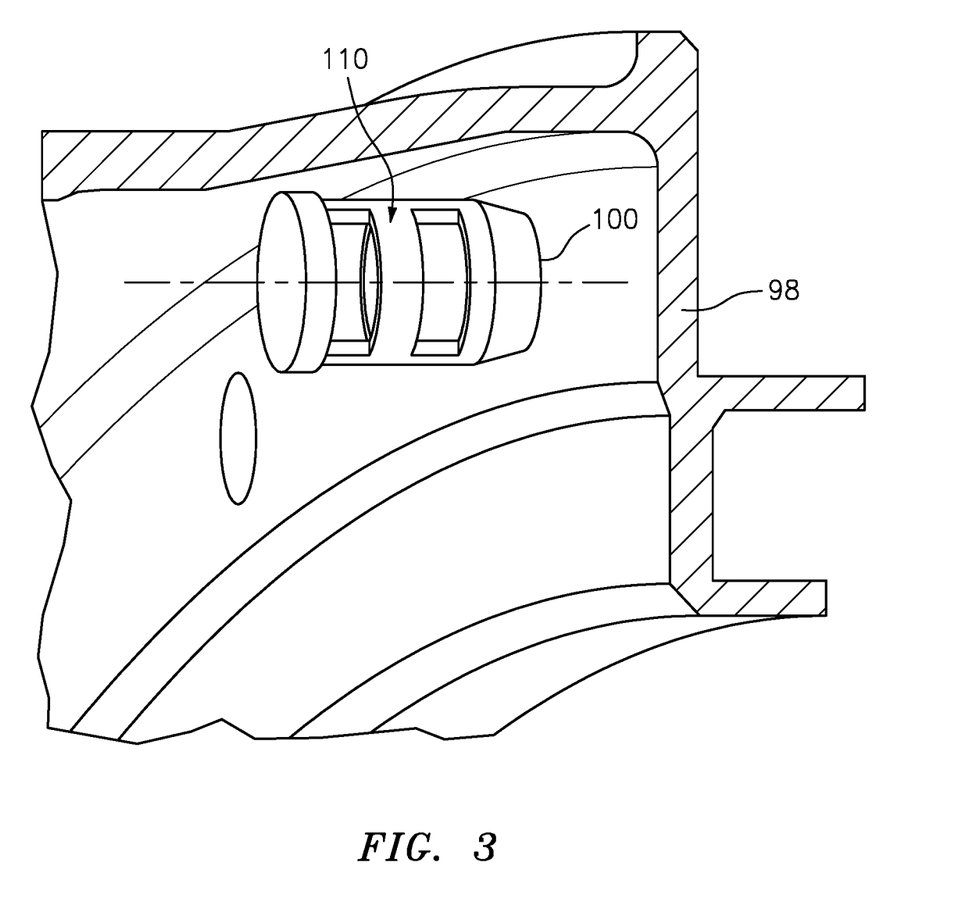
FIG. 3 is a perspective view of the debris separator mounted within a first vane support.
Figure 5:
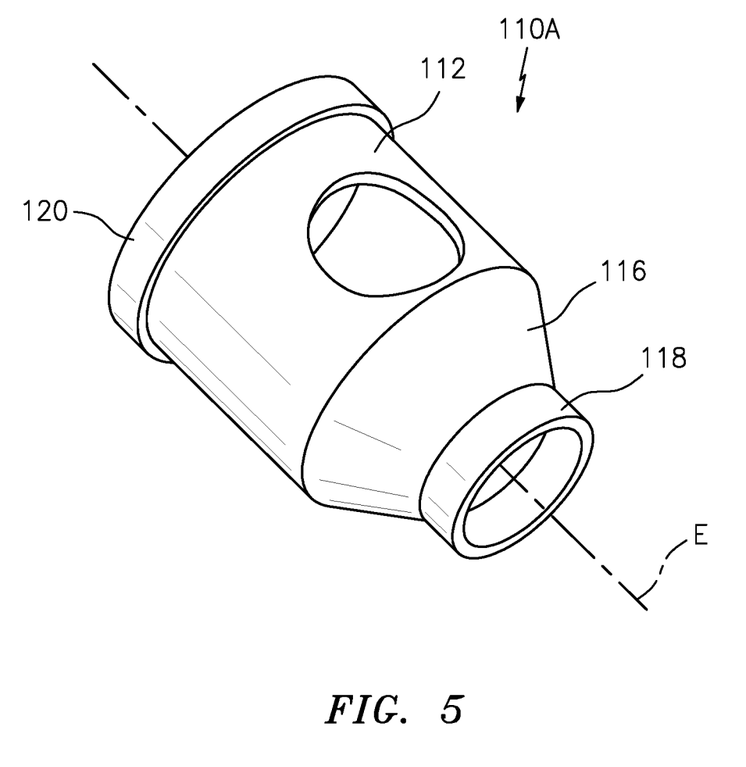
FIG. 5 is a perspective view of the debris separator according to another disclosed non-limiting embodiment.

The first body section 112 has a closed end 120 along the axis "E" opposite the exit orifice 124. The one or more inlet orifices 114 may be formed as slots (FIGS. 3 and 4) or, in another embodiment, a circular opening in a debris separator 110A (FIG. 5). The closed end 120, the first body section 112, the second body section 118, and the neck section 116 may be formed as an integral tubular component such as in brass cartridge case manufacturing in which cups are drawn and formed.

Figure 6:
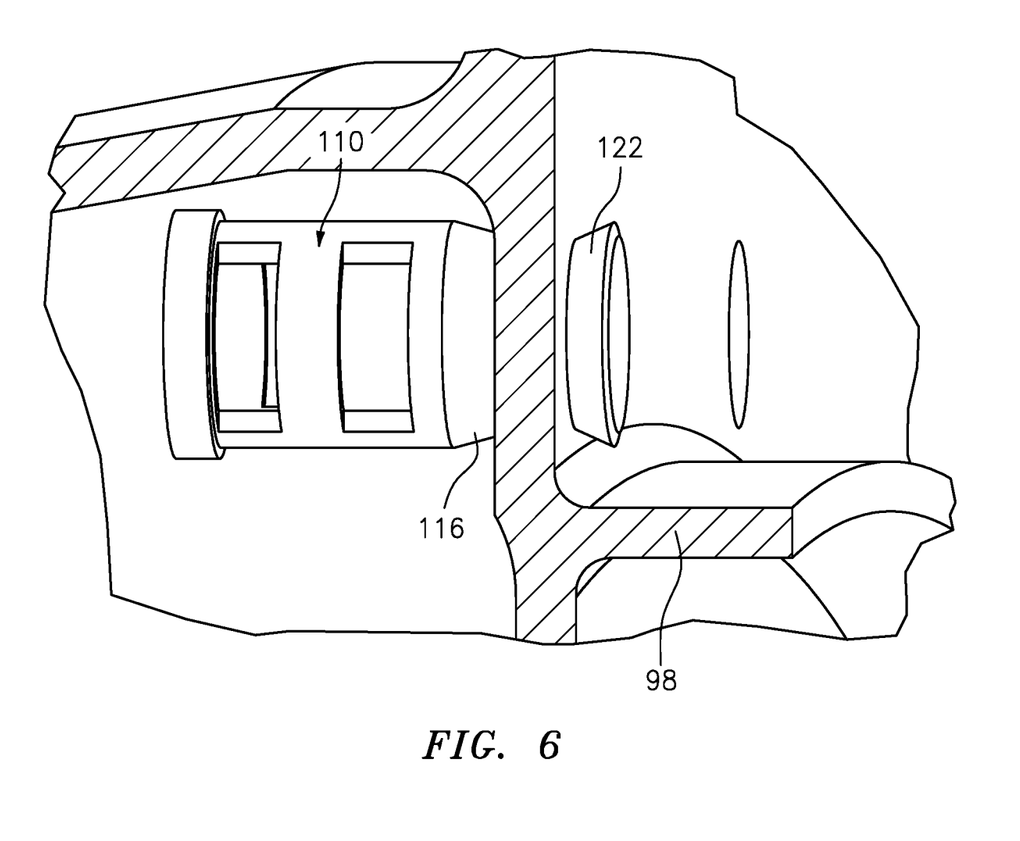
FIG. 6 is a perspective view of the debris separator mounted within a first vane support via a flared end.

Each debris separator 110 is installed into the respective aperture 100 and retained therein by flaring the second body section 118 at a flared end 122 (FIG. 6). The neck section 116 abuts the first vane support 98 and the flared end 122 abuts an opposite side of the first vane support 98 to form the exit orifice 124 (FIG. 6).

The first body section 112 may be of various diameters in comparison to the second body section 118. In embodiments, the first body section 112 may be of a relatively large diameter compared to the second body section 118 and include a relatively large cylinder and inlet orifices 114 to increase the particle collection efficiency.

During operation of the engine, cooling air from the high pressure compressor flows around the combustor and into the first vane cavity 102. This cooling air has particulates entrained in it. These particulates are present in the working medium flow path as they are ingested from the environment by the engine. The majority of the particulates are very fine in size, thus they are carried through the different sections of the engine as the working medium gases flow axially downstream.

Once the cooling air enters the first vane cavity 102, it is metered through the inlet orifices 114 of the debris separator 110 and is ejected through the exit orifice 124. As the inlet orifices 114 are transverse to the cooling air flow, the particulates cannot make the turn into the inlet orifices 114 and are collected in the first vane cavity 102 (FIG. 3) which is less susceptible to particulate blockage then downstream cavities. The erosion of the turbine case is reduced significantly as the energy of the particulates has been dissipated prior to impacting with the turbine case.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed:

1. A debris separator for a gas turbine engine component, comprising:
   a first body section along an axis, wherein the first body section comprises atleast one inlet orifice further comprising a slot, the first body section comprising a first orifice;
   a neck section adjacent to the first body section along the axis; and
   a second body section along the axis adjacent to the neck region, the second body section forming an exit along the axis.

2. The debris separator as recited in claim 1, wherein the first body section has a closed end and said first orifice opens radially outwardly.

3. The debris separator as recited in claim 1, wherein the second body section is of a diameter less than a diameter of the first body section.

4. The debris separator as recited in claim 1, wherein the second body section is flared.

5. The debris separator as recited in claim 1, wherein the first body section and the second body section are tubular.

6. A gas turbine engine, comprising:
   a vane support with a vane support aperture; and
   a debris separator according to claim 1 mounted at least partially through the aperture in the vane support.

7. The gas turbine engine as recited in claim 6, wherein the debris separator comprises:
   a first body section along an axis, the first body section comprising a first orifice;
   a neck section adjacent to the first body section along the axis; and
   a second body section along the axis adjacent to the neck region, the second body section forming an exit along the axis.

8. The gas turbine engine as recited in claim 7, wherein the neck section abuts the vane support and the second body region passes at least partially through the vane support aperture.

9. The gas turbine engine as recited in claim 8, wherein the second body section is flared to retain the debris separator within the vane support aperture.

10. The gas turbine engine as recited in claim 7, wherein the debris separator comprises:
    a first body section along an axis, the first body section defining the first orifice transverse to the vane support aperture.

11. The gas turbine engine as recited in claim 7, wherein the debris separator comprises: a neck section adjacent to the first body section along the axis, the neck section abuts the vane support aperture.

12. The gas turbine engine as recited in claim 7, wherein the debris separator comprises: a second body section along the axis adjacent to a neck region, the second body section passes at least partially through the vane support aperture.

13. The gas turbine engine as recited in claim 7, wherein the vane support aperture defines an axis parallel to an engine axis.

14. A method of installing a debris separator according to claim 1 for a gas turbine engine component, the method comprising:
    inserting a debris separator into a vane support aperture; and
    flaring the debris separator opposite a closed end to retain the debris separator in the vane support aperture.

15. The method as recited in claim 14, wherein inserting the debris separator into the vane support aperture comprises inserting the debris separator such that a neck section contacts upon the vane support.

16. The method as recited in claim 15, wherein flaring the debris separator comprises flaring a second body section downstream of the neck section.

17. The method as recited in claim 15, further comprising integrally forming the debris separator as an integral tubular component.

18. The method as recited in claim 15, further comprising integrally forming a closed end, a first body section, a second body section, and the neck section between the first and second body section.

* * * * *